US011203263B2

(12) United States Patent
Strasser

(10) Patent No.: US 11,203,263 B2
(45) Date of Patent: Dec. 21, 2021

(54) SYSTEM WITH A HIGH-VOLTAGE BATTERY AND A COUPLING DEVICE, MOTOR VEHICLE, AND METHOD FOR OPERATING A COUPLING DEVICE

(71) Applicant: AUDI AG, Ingolstadt (DE)

(72) Inventor: Roman Strasser, Gaimersheim (DE)

(73) Assignee: AUDI AG, Ingolstadt (DE)

(*) Notice: Subject to any disclaimer, the term of this patent is extended or adjusted under 35 U.S.C. 154(b) by 323 days.

(21) Appl. No.: 15/909,192

(22) Filed: Mar. 1, 2018

(65) Prior Publication Data

US 2018/0281602 A1  Oct. 4, 2018

(30) Foreign Application Priority Data

Mar. 30, 2017  (DE) .......................... 102017205403.4

(51) Int. Cl.
*B60L 3/04* (2006.01)
*B60L 11/18* (2006.01)
(Continued)

(52) U.S. Cl.
CPC ............... *B60L 3/04* (2013.01); *B60L 3/0007* (2013.01); *B60L 3/0069* (2013.01); *B60L 3/12* (2013.01);
(Continued)

(58) Field of Classification Search
CPC .. B60L 3/04; B60L 3/12; B60L 3/0069; B60L 3/0007; B60L 3/00; B60L 11/1851;
(Continued)

(56) References Cited

U.S. PATENT DOCUMENTS

| 2006/0055246 A1* | 3/2006 | Jansen | B60L 3/0053 307/87 |
| 2009/0295401 A1* | 12/2009 | Kamata | G01R 31/006 324/509 |

(Continued)

FOREIGN PATENT DOCUMENTS

| DE | 102004007851 A1 | 9/2005 |
| DE | 102010049611 A1 | 6/2011 |

(Continued)

OTHER PUBLICATIONS

Examination Report dated Dec. 22, 2017 of corresponding German Application No. 102017205403.4; 10 pgs.

(Continued)

*Primary Examiner* — Richard Isla
*Assistant Examiner* — Dung V Bui
(74) *Attorney, Agent, or Firm* — Maier & Maier, PLLC

(57) ABSTRACT

A system with a high-voltage battery and a coupling device that couples the high-voltage battery to a high-voltage onboard power supply system of a motor vehicle. The coupling device couples a positive pole and a negative pole with corresponding phases of the high-voltage power supply system. The coupling device includes a current measurement device that measures the current flowing between a first electrically conductive connection and a first interface and/or the current flowing between a second electrically conductive connection and a second interface, an actuating device, and at least one first semiconductor switch, as well as at least one second semiconductor switch, which is coupled between the second electrically conductive connection and the second interface. The first semiconductor switch includes a first control electrode and the second semiconductor switch includes a second control electrode, which are coupled to the actuating device.

8 Claims, 2 Drawing Sheets

(51) Int. Cl.
  *B60R 16/033* (2006.01)
  *B60L 3/12* (2006.01)
  *B60L 3/00* (2019.01)
  *H01H 39/00* (2006.01)
  *B60L 58/10* (2019.01)

(52) U.S. Cl.
  CPC ............ *B60L 58/10* (2019.02); *B60R 16/033* (2013.01); *H01H 39/006* (2013.01); *B60L 2240/547* (2013.01); *H01H 2039/008* (2013.01); *Y02T 10/70* (2013.01); *Y02T 10/72* (2013.01)

(58) Field of Classification Search
  CPC .. B60L 11/18; B60L 16/033; B60L 2240/547; B60L 58/10; H01H 39/006; H01H 39/00; H01H 2039/008; B60R 16/033; Y02T 10/7005; Y02T 10/7241
  USPC ......................................................... 320/107
  See application file for complete search history.

(56) References Cited

U.S. PATENT DOCUMENTS

| | | | | |
|---|---|---|---|---|
| 2011/0025369 A1* | 2/2011 | Quarto | ................ | G01R 31/343 324/765.01 |
| 2012/0256611 A1* | 10/2012 | Fukui | .................... | H02J 7/0063 323/304 |
| 2012/0306264 A1* | 12/2012 | Komma | ................ | H01H 9/542 307/9.1 |
| 2013/0307351 A1* | 11/2013 | Kusch | .................. | H01H 47/001 307/125 |
| 2015/0224881 A1* | 8/2015 | Deyda | .................... | G01H 17/00 701/29.2 |
| 2015/0343904 A1* | 12/2015 | Ikeyama | ............... | B60L 3/0084 701/22 |
| 2015/0372477 A1* | 12/2015 | Mo | ....................... | H01M 16/00 361/91.5 |
| 2016/0368390 A1* | 12/2016 | Yang | ....................... | B60L 50/51 |
| 2018/0043789 A1* | 2/2018 | Goetz | ................. | B60L 11/1879 |

FOREIGN PATENT DOCUMENTS

| | | |
|---|---|---|
| DE | 102011008700 A1 | 7/2012 |
| DE | 102011013182 A1 | 9/2012 |
| DE | 102011106855 A1 | 12/2012 |
| DE | 102014202504 A1 | 8/2015 |
| DE | 102015206259 A1 | 10/2015 |
| DE | 102015200316 A1 | 7/2016 |
| DE | 102015105426 A1 | 10/2016 |
| WO | 2005/115805 A1 | 12/2005 |

OTHER PUBLICATIONS

Chinese Office Action dated May 19, 2021, in connection with corresponding CN Application No. 201810268637.7 (17pp., including machine-generated English translation).

* cited by examiner

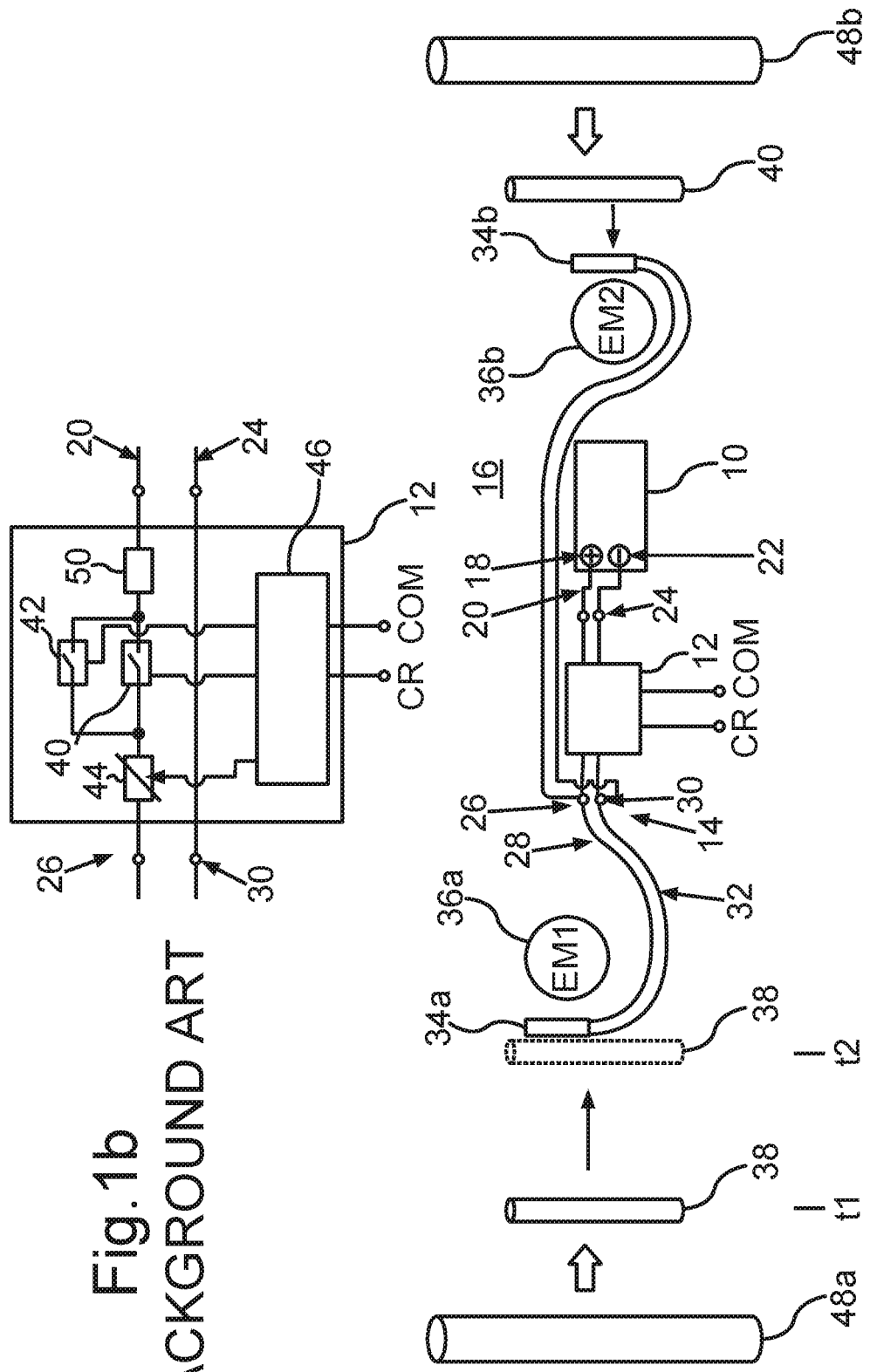

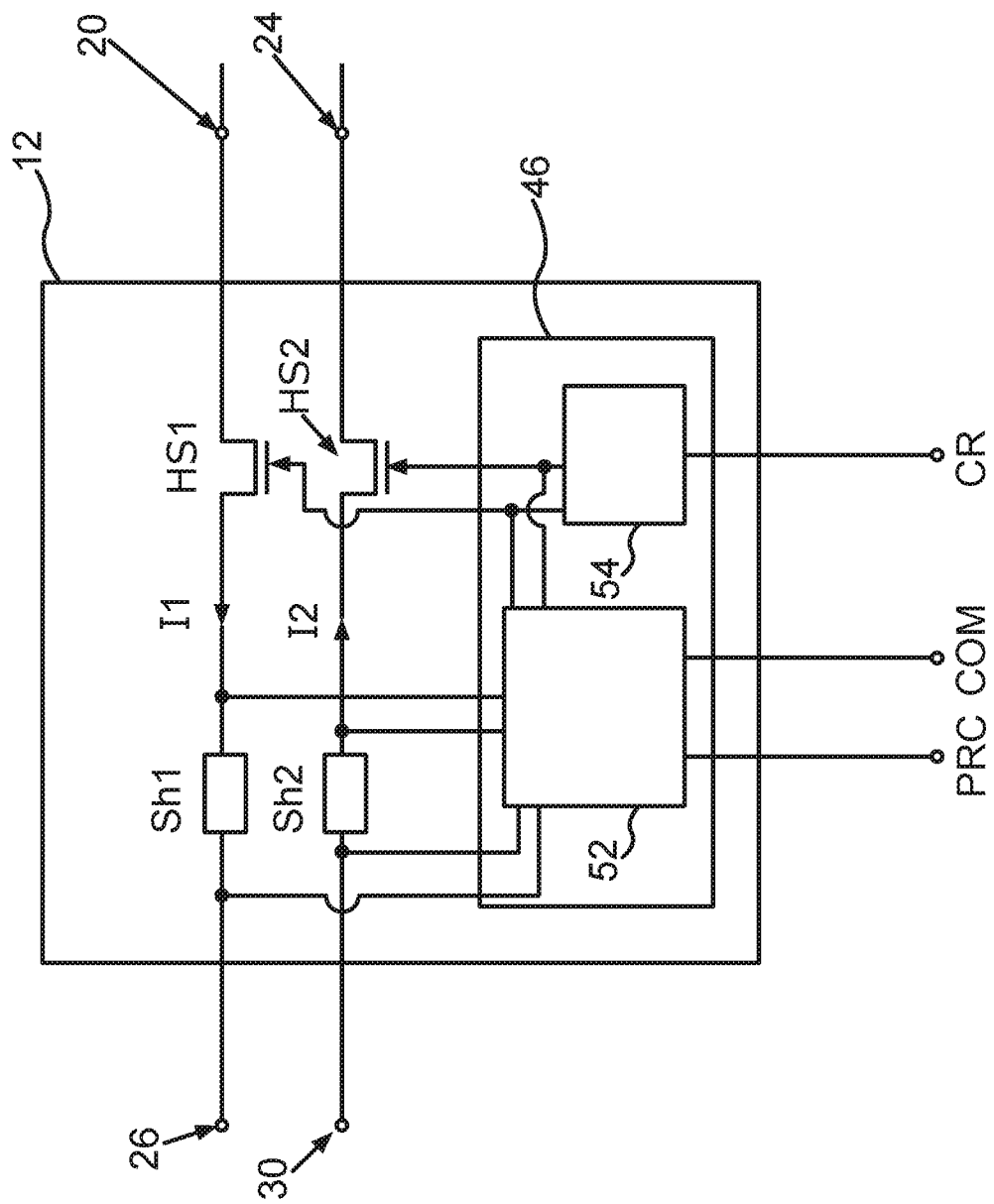

SYSTEM WITH A HIGH-VOLTAGE BATTERY AND A COUPLING DEVICE, MOTOR VEHICLE, AND METHOD FOR OPERATING A COUPLING DEVICE

FIELD

The present invention relates to a system with a high-voltage battery and a coupling device that is designed to couple the high-voltage battery to a high-voltage onboard power supply system of a motor vehicle, wherein the coupling device is connected via a first electrically conductive connection to the positive pole of the high-voltage battery and via a second electrically conductive connection to the negative pole of the high-voltage battery, wherein the coupling device further comprises a first interface for connection to a first electric phase of the high-voltage onboard power supply system and a second interface for connection to a second electric phase of the high-voltage onboard power supply system. The invention further relates to a corresponding motor vehicle and to a method for operating a coupling device that is designed to couple a high-voltage battery to a high-voltage onboard power supply system of a motor vehicle, said method comprising the following steps: connection of the coupling device via a first electrically conductive connection to the positive pole of the high-voltage battery and connection of the coupling device via a second electrically conductive connection to the negative pole of the high-voltage battery; connection of the coupling device via a first interface to a first electric phase of a high-voltage onboard power supply system and connection of the coupling device via a second interface to a second electric phase of the high-voltage onboard power supply system.

BACKGROUND

A known system of this kind of the prior art is illustrated schematically in FIG. 1a. Therein, a high-voltage battery 10 is coupled via a coupling device 12, a so-called battery junction box (BJB), to a high-voltage onboard power supply system 14 of a motor vehicle 16. The positive pole 18 of the high-voltage battery 10 is connected via a first electrically conductive connection 20 to the coupling device 12, whereas the negative pole 22 of the high-voltage battery 10 is coupled via a second electrically conductive connection 24 likewise to the coupling device 12. The coupling device 12 has a first interface 26, by way of which it is connected to a first electric phase 28 of the high-voltage onboard power supply system 14, and a second interface 30, by way of which it is connected to a second electric phase 32 of the high-voltage onboard power supply system 14.

Different high-voltage consumers are coupled to the high-voltage onboard power supply system 14, of which, by way of example, a first inverter 34a for a first electric motor 36a and a second inverter 34b for a second electric motor 36b are shown. Besides the inverters 34, particularly an air-conditioner compressor and heating devices come into consideration as further high-voltage consumers, in particular a passenger compartment heater or window heater.

Further illustrated are a front bumper 38 and a rear bumper 40 of the motor vehicle 16.

The inner workings of the coupling device 12 are illustrated in detail in the illustration of FIG. 1b. As can be seen, the coupling device 12 has a contactor 40, which is coupled between the electrically conductive connection 20 and the interface 26, and a precharging contactor 42, which is connected in parallel to the contactor 40. By way of precharging contactors 42, it is possible to charge empty capacitors of high-voltage consumers prior to switching them on, without the danger of damaging power peaks. A so-called pyrofuse 44 is arranged in serial connection to the parallel connection of the contactors 40, 42. What is involved here is a pyrotechnic fuse, which, in the event of a crash, can open within a few thousands of a second by ignition of an explosive mixture. For actuation of the pyrofuse 44, the precharging contactors 42, and the contactor 40, an actuating device 46 is provided, to which a crash signal of an airbag control device, for example, can be delivered via an input CR. Arranged in serial connection to the parallel connection of the precharging contactor 42 and the contactor 40 is a circuit breaker 50, in particular a fuse, which fuses when a current surge occurs and thereby disconnects the high-voltage battery 10 from the high-voltage onboard power supply system 14.

Via a input COM of the actuating device 46, it is possible to deliver an activation signal for activation of the precharging contactor 42.

Returning to FIG. 1a, the problem on which the present invention is based will be discussed below in detail. It can be seen here that the electric motor 36a and thus the inverter 34a are arranged very far forward in the motor vehicle 16, whereas the electric motor 36b and the inverter 34b are arranged very far backward in the motor vehicle 16. If the front of the vehicle strikes a pole 48a, for example, the bumper 38 is shifted from the position at the point in time t1 to the position at the point in time t2. If a crash, that is, an accident, of the vehicle, is detected by a crash sensor, a corresponding activation signal is applied to the actuating device 46 via the input CR. Subsequently, the contactor 40 can be opened in order to break an electric coupling of the inverter 34a to the positive pole 18 of the high-voltage battery 10. On account of the inertia of a fuse, this takes between 10 and 30 ms. If, in the event of a crash, the inverter 34a were coupled to the positive pole 18 and the negative pole 22 of the battery 10, a short circuit in the inverter 34a could occur, as a result of which in a high voltage system, the high short-circuit current that flows could lead to a hot spot. In a high-voltage system, a short circuit can occur only between the positive pole 18 and the negative pole 20 of the battery 10, because there—in contrast to low-voltage systems—the negative pole 22 is not connected to the vehicle ground. If, as can be the case in a pole crash, no crash sensor initially responds, the pole 48a can penetrate very far into the front end of the motor vehicle 16. When, as illustrated by way of example, a crash is then detected after a period of time, which can amount to between 20 and 50 ms, and, for example, an airbag of the motor vehicle 16 is triggered, this crash signal can be delivered via the input CR to the coupling device 12 and used to ignite the pyrofuse 44. In this case, another 2 to 8 ms elapse. This can be too late in time for decoupling the inverter 34a from the positive pole 18 and/or the negative pole 22 of the battery 10, so that the danger of a short circuit cannot be reliably prevented.

In a rear-end crash due to a pole 48b, there is likewise the danger of a deformation of the inverter 34b owing to the fact that, in this case, the pole 48b shoves the rear bumper 40 onto the electric motor 36b, which, in turn, then deforms the inverter 34b.

Accordingly, in the case of different crash events, it could occur that a high-voltage consumer is deformed before the high-voltage battery has been safely disconnected from the high-voltage onboard power supply system. In the case of contactors, there is the problem, in addition to the danger that they break the circuit too late on account of their latent opening time, that they become stuck or welded together and accordingly do not open at all any more when the short-circuit current is already very high at the time of opening. In the event of a crash, the circuit breaker can be tripped too late, so that the danger of a hot spot already exists, even though the short-circuit current is still not high enough to bring about a tripping of the circuit breaker.

In order to counter this, another measure for preventing a short circuit is known from the prior art, this measure consisting in additionally armoring high-voltage consumers. On account of this additional armoring, the high-voltage consumers are deformed only when the contactor 40 has been safely disconnected. On account of the material thickness that is to be chosen, the total weight of the motor vehicle 16, illustrated in FIG. 1a by way of example, is increased. Beyond this, undesired additional costs ensue as a result of armoring of this kind.

Accordingly, in summary, a coupling device 12 that is known from the prior art comprises a circuit breaker 50, contactors 40 for connecting and disconnecting the battery voltage, a pyrofuse 44 for rapid disconnection of the high-voltage battery power supply system 14 from the high-voltage battery 10 in the event of a crash, for example, and precharging contactors 42 for precharging the high-voltage consumers 34a, 34b, which are coupled to the high-voltage onboard power supply system, prior to closing of the contactors 40.

Such a large number of structural elements necessitate an undesirably large installation or packing space. The assembly of such a large number of elements is time-consuming and thus cost-intensive. Beyond this, in the case of the pyrofuse 44, there is the problem that it is not reversible; that is, it has to be replaced once it has been tripped. This results in substantial undesired additional costs. These are manifested, in particular, against the background that a deformation of a high-voltage consumer is not always to be feared for each crash in which an airbag is triggered.

Known from DE 10 2011 013 182 A1 is a safety traction battery for an electric vehicle. In this case, a safety device of the electric vehicle measures a current flow and, when a limit value is exceeded, disconnects battery cell cascades into groups with voltage potentials that are not dangerous. Described, among other things, is a current sensor that is arranged in the current path of the traction battery and is coupled to a control device, which, when a predetermined current flow is exceeded, activates the disconnecting operation. Electronic power switches are used for this disconnection.

Known from DE 10 2004 007 851 A1 is an intelligent connection device for a vehicle battery. The connection device is created by a pole terminal for a battery that comprises a current measurement module in order to determine the capacity of the vehicle battery.

Known from WO 2005/115805 A1 is an electronic battery circuit breaker for a low-voltage onboard power supply system, that is, a 12-V onboard power supply system, which makes possible a safe and reversible disconnection of the onboard power supply system of the motor vehicle from the battery. For this purpose, an electronic semiconductor switch, which allows an unlimited number of switching cycles, is used. The semiconductor switch breaks the electric connection of the onboard power supply system of the motor vehicle and the battery when a crash signal or an excess current signal is present or when the ignition is switched off. In the case of a 12-V system, the vehicle constitutes the electric ground, for which reason the solution in accordance with the cited WO 2005/115805 A1 cannot be extended to a high-voltage onboard power supply system. In the cited WO 2005/115805 A1, the battery circuit breaker is provided in a module, which is fastened at or on the battery and directly comprises the positive terminal pole of the battery. Accordingly, what is involved in this case is a single-pole disconnection. A battery circuit breaker of this kind is accordingly not a coupling device in the sense of the present invention.

SUMMARY

The object of the present invention, therefore, is to develop further a system with a high-voltage battery and a coupling device, as mentioned in the introduction, as well as a method for operating a coupling device, as mentioned in the introduction, in such a way that a wiring short circuit is prevented as reliably as possible with a packing space that is as small as possible.

This object is achieved by a system with a high-voltage battery and a coupling device as well as by a method for operating a coupling device.

The present invention is based on the realization that semiconductor switches can also be utilized in high-voltage onboard power supply systems for reliably preventing wiring short circuits when they are used skillfully after careful analysis of the conditions and necessities in a high-voltage onboard power supply system. As a result, a coupling device of a system according to the invention therefore further comprises a current measurement device, which is designed to measure the current flowing between the first electrically conductive connection and the first interface and/or the current flowing between the second electrically conductive connection and the second interface. In addition, an actuating device is provided that is coupled to the current measurement device.

The system according to the invention further comprises at least one first semiconductor switch, which is coupled between the first electrically conductive connection and the first interface, as well as at least one second semiconductor switch, which is coupled between the second electrically conductive connection and the second interface, wherein the first semiconductor switch comprises a first control electrode and the second semiconductor switch comprises a second control electrode, which are coupled to the actuating device.

By way of these measures, it is possible, even in the case when a current that merely points to a short circuit is measured in a connection to the battery, to severe both connections to the high-voltage battery. By means of a semiconductor switch, this can occur, nearly free of a latency period, within a time order of one µs. In this way, it is possible to reliably prevent a wiring short circuit even in the event of a pole crash. The system can react even long before the occurrence of critical current surges due to penetration of the pole into the motor vehicle. For a semiconductor switch, in particular, a high-voltage semiconductor switch, even for conventional voltages of at least 60 V in a high-voltage onboard power supply system, there is no danger of any sticking or welding together. A semiconductor switch engages in such a fast manner that a pyrofuse can be dispensed with. On account of the possible rapid switching operations for a semiconductor switch, a circuit breaker can also be dispensed with. This results, on the one hand, in low costs and, on the other hand, in a small packing space requirement for a coupling device of this kind. Beyond this, it is possible by means of the semiconductor switch for the basic function of the contactors used in the prior art to be likewise executed, namely, the switching on and off of the battery voltage on the high-voltage onboard power supply system. As needed, additional contactors can be arranged for galvanic disconnection of switches that are connected in series to the semiconductor switches.

The current measurement device, for example, can be created with the use of shunts or by means of Hall sensors. In the prior art, too, high-voltage onboard power supply systems in which a current measurement device is provided are known, namely for measurement of the instantaneous current consumption, for example, in order to thereby predict a travel range of the motor vehicle. For motor vehicles equipped in this way, the current measurement device can be equipped especially advantageously in terms of cost for implementation of the above-described measures according to the invention.

A preferred embodiment is characterized in that the actuating device has a first input for delivery of an indicator signal that is correlated with a crash and/or with a pre-crash of the motor vehicle, wherein the actuating device is designed, when it receives the indicator signal at the first input, to open the at least one first semiconductor switch and/or the at least one second semiconductor switch. As already mentioned, in accordance with the invention, the semiconductor switch can break the connection between the high-voltage onboard power supply system and the high-voltage battery not only when an excess current is detected by means of the current measurement device, but also when it is opened by means of an indicator signal that indicates a crash or a pre-crash of the motor vehicle, as a result of which the motor vehicle is disconnected from the current. For example, a control signal of an airbag control device of the motor vehicle can be used as an indicator signal indicating a crash. An indicator signal indicating a pre-crash can be generated by a pre-crash detection device—for example, by sensors such as radar, cameras, and the like. In this way, at an especially early point in time, the semiconductor switch can open or disconnect the connection between the high-voltage battery and the high-voltage onboard power supply system, when, with the greatest certainty, no short circuit current has started to flow. In contrast to the prior art, for which a pyrofuse is used for rapid disconnection, the disconnection by means of a semiconductor switch is reversible. Should no crash then occur following a detected pre-crash, the high-voltage battery can once again be connected to the high-voltage onboard power supply system without any detriment to comfort and safety. Accordingly, on account of the reversibility, the activation range in the case of the present invention can be chosen to be greater than when a pyrofuse according to the prior art is used, because, in the present instance, in contrast to the prior art, an unnecessary disconnecting of the connection between the high-voltage battery and the high-voltage onboard power supply system does not entail any cost-intensive consequences. This results in a further increase in safety for the occupants of the motor vehicle.

Preferably, the actuating device is designed in this case such that the indicator signal is not sustained after a predetermined period of time or such that the actuating device receives a cancellation signal to close or connect again at least the previously disconnected semiconductor switch. In this way, it can be ensured that, after a currentless phase of 30 ms to 50 ms, for example, the high-voltage onboard power supply system is supplied once again with current from the high-voltage battery. Such a short period of time does not lead to any impairment in operation of the vehicle, but does increase substantially the safety of the vehicle occupants.

The actuating device can comprise a switch arrangement for processing of the indicator signal, said switch arrangement comprising exclusively hard-wired hardware components, that is, a hardware logic, and thus making possible an especially fast, direct hardware response. In contrast to a software solution or a software-assisted solution, it is possible in this way to achieve markedly faster switching operations of the semiconductor switch. Beyond this, in the case of a software solution, there is the danger that it "freezes" or that a program crash occurs. More preferably, the indicator signal indicating a crash is channeled via a hardware logic, which is hard-wired in this way, through the actuating device, in order to actuate the control electrode of at least one of the semiconductor switches.

In accordance with an especially advantageous embodiment, the actuating device is designed, when it receives an excess current signal from the current measurement device, indicating a current flow through the current measurement device that exceeds a predetermined threshold value, to open at least the first semiconductor switch. In this way, it is possible to adjust precisely the response behavior of the semiconductor switch, this resulting in a high reliability of the system.

The actuating device can further have a second input for delivery of an activation signal for the high-voltage onboard power supply system, wherein the actuating device is designed, when it receives the activation signal, to actuate at least the first semiconductor switch in such a way that a precharging function for the high-voltage onboard power supply system, in particular for consumers of the high-voltage onboard power supply system, is executed. In this way, in a system according to the invention, it is possible for the semiconductor switches additionally to take on the function of the precharging contactors of the prior art, without any additional component being required for this purpose. In this context, it is especially preferred when the actuating device for execution of the precharging function is designed to actuate at least the first semiconductor switch in a pulsewidth-modulated manner, that is, in a clocked manner, or to actuate it in analog operation. In this way, it is possible for high-voltage consumers that are coupled to the high-voltage onboard power supply system to be coupled gradually to the high-voltage battery without any power peaks and accordingly without a danger of damage to the high-voltage consumers. This results in an increase in the service life of the high-voltage consumers.

In particular, in this context, the actuating device for processing of the activation signal can comprise a switch arrangement, which can be programmed or is programmed by software, in particular a bus system and/or a microcontroller, in particular a field programmable gate array (FPGA) and/or a complex programmable logic device (CPLD). In this way, in contrast to hardware processing of the crash signal, it is possible to adapt a connection of the high-voltage battery to the high-voltage onboard power supply system quite specifically to the respectively activated high-voltage consumers, that is, particularly to the capacity of the capacitors used in the respective high-voltage consumers. In this way, on the one hand, a fast connection is made possible and, on the other hand, this occurs with the lowest demand being placed on components, in particular capacitors, of the high-voltage consumers.

The preferred embodiments presented in relation to the system according to the invention and the advantages thereof apply correspondingly to a motor vehicle according to the invention with a system of this kind as well as to a method according to the invention for operating a coupling device.

In addition, a motor vehicle according to the invention with a system of this kind preferably has at least one pre-crash sensor, which is coupled to the actuating device in order to supply the indicator signal to the actuating device. As already discussed further above in connection with an indicator signal that is correlated with a pre-crash of the motor vehicle, a pre-crash sensor—for example, a camera or a radar—can deduce, from the detection of the current traffic situation, indications that, with a certain likelihood, point to anticipation of an accident in a short time. For example, if another motor vehicle that is on collision course with one's own motor vehicle is detected, with the distance between the two motor vehicles being less than a predetermined threshold. In this case, the device acting as a pre-crash sensor can apply a corresponding indicator signal to the actuating device, as a result of which the latter opens at least one of the semiconductor switches of the system according to the invention in order to disconnect the high-voltage battery from the high-voltage onboard power supply system.

BRIEF DESCRIPTION OF THE DRAWINGS

In the following, an exemplary embodiment of the present invention will now be described in detail with reference to the appended drawings. The drawings show:

FIG. 1a in schematic illustration, a system known from the prior art with a high-voltage battery and a coupling device that is designed to couple the high-voltage battery to a high-voltage onboard power supply system of a motor vehicle;

FIG. 1b in schematic illustration, a system known from the prior art with a high-voltage battery and a coupling device that is designed to couple the high-voltage battery to a high-voltage onboard power supply system of a motor vehicle; and FIG. 2 in schematic illustration, an exemplary embodiment of a coupling device of a system according to the invention, which can be used in the system illustrated in FIGS. 1a and 1b instead of the coupling device known from the prior art, in order to create a system according to the invention.

The reference characters introduced in reference to FIGS. 1a and 1b are further used for the explanations in regard to FIG. 2 insofar as identical or identically acting components are in question.

DETAILED DESCRIPTION OF THE DRAWINGS

For the coupling device 12, illustrated in FIG. 2, the series connection of a shunt Sh1 and of a semiconductor switch HS1 is arranged between the interface 26 and the electrically conductive connection 20. Arranged between the interface 30 and the electrically conductive connection 24 is the series connection of a shunt Sh2 and of a semiconductor switch HS2. The actuating device 46 has a microcontroller 52 as well as a hardware logic 54. The control electrodes of the semiconductor switches HS1 and HS2 are both coupled to outputs of the microcontroller 52 as well as to outputs of the hardware logic 54. A crash signal CR is delivered to the hardware logic 54 at its input end, whereas a pre-crash signal PRC as well as an activation signal COM are delivered to the microcontroller 52 at its input end. Beyond this, the dropping voltage at the respective shunts Sh1, Sh2 is delivered to the microcontroller 52. From these voltage values, the microcontroller 52, knowing the resistance values of the shunts Sh1, Sh2, can determine the amplitude of the current I1 that flows from the electrically conductive connection 20 to the interface 26 as well as the current I2 that flows from the interface 30 to the electrically conductive connection 24.

The actuating device 46, in particular the hardware logic 54, is designed, when a crash signal CR is received, to open at least one of the semiconductor switches HS1, HS2 and preferably both semiconductor switches HS1, HS2. The actuating device 46 is further designed, when a pre-crash signal PRC is received, to open at least one of the semiconductor switches HS1, HS2 and preferably both semiconductor switches HS1, HS2. If the actuating device, in particular the microcontroller 52, receives an activation signal COM, then it controls at least one of the semiconductor switches HS1, HS2 and in particular both semiconductor switches HS1, HS2 for executing a precharging function for the high-voltage onboard power supply system. This occurs by way of clocked operation of the at least one semiconductor switch HS1, HS2 and in particular by pulse-width modulation or by analog operation of the semiconductor switches HS1, HS2.

Furthermore, the microcontroller 52 of the actuating device 46 is designed, in the case when at least one of the currents I1, I2 exceeds a predetermined threshold, to actuate at least one of the semiconductor switches HS1, HS2 and, in particular, both semiconductor switches HS1, HS2 in such a way that they open.

The invention claimed is:

1. A system, comprising:
   a high-voltage battery and a coupling device that is designed to couple the high-voltage battery to a high-voltage onboard power supply system of a motor vehicle,
   wherein the coupling device is connected via a first electrically conductive connection to a positive pole of the high-voltage battery and via a second electrically conductive connection to a negative pole of the high-voltage battery,
   wherein the coupling device further comprises a first interface for connection to a first electric phase of the high-voltage onboard power supply system and a second interface for connection to a second electric phase of the high-voltage onboard power supply system, and
   wherein the coupling device further comprises:
   a current measurement device that is designed to measure a first current flowing between the first electrically conductive connection and the first interface and/or a second current flowing between the second electrically conductive connection and the second interface;
   an actuating device, which is coupled to the current measurement device;
   at least one first semiconductor switch, which is coupled between the first electrically conductive connection and the first interface, as well as at least one second semiconductor switch, which is coupled between the second electrically conductive connection and the second interface, wherein the first semiconductor switch comprises a first control electrode and the second semiconductor switch comprises a second control electrode, which are coupled to the actuating device, and
   at least one pre-crash sensor, which is coupled to the actuating device in order to supply an indicator signal to the actuating device,
   wherein the actuating device has a first input for delivery of the indicator signal that is correlated with a crash and/or with a pre-crash of the motor vehicle, wherein the indicator signal indicating the pre-crash is generated by the at least one pre-crash sensor including at least one radar and at least one camera, wherein the actuating device further has a second input for delivery of an activation signal for the high-voltage onboard power supply system, wherein the actuating device includes a first switch arrangement for processing the indicator signal and a second switch arrangement for processing of the activation signal, wherein the first switch arrangement comprises exclusively hard-wired hardware structural elements without a software-assisted solution to prevent freezes of the system caused by a program crash, wherein the second switch arrangement is a programmable and/or software-assisted system, wherein the actuating device is designed, when it receives the indicator signal at the first input, to open the at least one first semiconductor switch and/or the at least one second semiconductor switch, wherein the actuating device is designed, in the case in which the indicator signal is not sustained after a predetermined period of time, to close again at least the previously opened semiconductor switch, such that the predetermined period of time is considered as a factor of closing the previously opened semiconductor switch, wherein the predetermined period of time after which the previously opened semiconductor switch is closed again is from 30 milli-second to 50 milli-second, wherein the current measurement device includes a shunt sensor and a Hall sensor.

2. The system according to claim 1, wherein the actuating device is further designed, in the case in which the actuating device receives a cancellation signal, to close again at least the previously opened semiconductor switch.

3. The system according to claim 1, wherein the actuating device is designed, when an excess current signal is received from the current measurement device and indicates a current flow through the current measurement device above a predetermined threshold, to open at least the first semiconductor switch.

4. The system according to claim 1, wherein the actuating device is designed, when it receives the activation signal, to actuate at least the first semiconductor switch in such a way that a precharging function for the high-voltage onboard power supply system, in particular for consumers of the high-voltage onboard power supply system, is executed.

5. The system according to claim 4, wherein the actuating device for execution of the precharging function is designed to actuate at least the first semiconductor switch in a pulse-width-modulated manner or in analog operation.

6. The system according to claim 4, wherein the second switch arrangement is programmed and/or controlled by software, in particular a bus system and/or a microcontroller, in particular a field programmable gate array and/or a complex programmable logic device.

7. The system according to claim 1, wherein at least one additional contactor is arranged for a galvanic disconnection of switches that are connected in series to the first and second semiconductor switches.

8. A method for operating a coupling device, which is designed to couple a high-voltage battery to a high-voltage onboard power supply system of a motor vehicle, comprising the following steps:
  connection of the coupling device via a first electrically conductive connection to a positive pole of the high-voltage battery and connection of the coupling device via a second electrically conductive connection to a negative pole of the high-voltage battery;
  connection of the coupling device via a first interface to a first electric phase of the high-voltage onboard power supply system and connection of the coupling device via a second interface to a second electric phase of the high-voltage onboard power supply system;
  measurement of a first current between the first electrically conductive connection and the first interface and/or measurement of a second current between the second electrically conductive connection and the second interface;
  actuation of at least one first semiconductor switch, which is coupled between the first electrically conductive connection and the first interface, as well as of at least one second semiconductor switch, which is coupled between the second electrically conductive connection and the second interface, depending on the first measured current and/or the second measured current, and
  supply of an indicator signal to an actuating device by at least one pre-crash sensor, which are coupled to the actuating device, wherein the actuating device has a first input for delivery of the indicator signal that is correlated with a crash and/or with a pre-crash of the motor vehicle, wherein the indicator signal indicating the pre-crash is generated by the at least one pre-crash sensor including at least one radar and at least one camera, wherein the actuating device further has a second input for delivery of an activation signal for the high-voltage onboard power supply system, wherein the actuating device includes a first switch arrangement for processing the indicator signal and a second switch arrangement for processing of the activation signal, wherein the first switch arrangement comprises exclusively hard-wired hardware structural elements without a software-assisted solution to prevent freezes of the system caused by a program crash, wherein the second switch arrangement is a programmable and/or software-assisted system, wherein the actuating device is designed, when it receives the indicator signal at the first input, to open the at least one first semiconductor switch and/or the at least one second semiconductor switch, wherein the actuating device is designed, in the case in which the indicator signal is not sustained after a predetermined period of time, to close again at least the previously opened semiconductor switch, such that the predetermined period of time is considered as a factor of closing the previously opened semiconductor switch, wherein the predetermined period of time after which the previously opened semiconductor switch is closed again is from 30 milli-second to 50 milli-second, wherein a current measurement device, that is designed to measure the first current and the second current, includes a shunt sensor and a Hall sensor.

* * * * *